United States Patent [19]
Moseley

[11] Patent Number: 4,658,936
[45] Date of Patent: Apr. 21, 1987

[54] BRAKE TEMPERATURE AND WEAR INDICATOR

[75] Inventor: Douglas D. Moseley, Uniontown, Ohio

[73] Assignee: Goodyear Aerospace Corporation, Akron, Ohio

[21] Appl. No.: 758,945

[22] Filed: Jul. 25, 1985

[51] Int. Cl.⁴ ............................................. F16D 66/02
[52] U.S. Cl. .................... 188/1.11; 116/208; 340/52 B
[58] Field of Search .......................... 188/1.11, 71.5; 192/30 W; 116/208, 216; 73/129; 340/52 A, 52 B; 374/141

[56] References Cited

U.S. PATENT DOCUMENTS

| | | | |
|---|---|---|---|
| 854,720 | 5/1907 | Dawson | 188/71.5 |
| 3,018,852 | 1/1962 | Stanton | 188/71.5 |
| 4,241,603 | 12/1980 | Han et al. | 188/1.11 X |
| 4,356,897 | 11/1982 | Urban | 188/1.11 |
| 4,520,661 | 6/1985 | Tamai et al. | 73/129 |

FOREIGN PATENT DOCUMENTS

| | | | |
|---|---|---|---|
| 2734786 | 2/1979 | Fed. Rep. of Germany | 188/1.11 |
| 1603741 | 11/1981 | United Kingdom | 188/1.11 |
| 889959 | 12/1981 | U.S.S.R. | 188/1.11 |

OTHER PUBLICATIONS

3 Drawing Figures Illustrating Prior Art Known to Inventor.

Primary Examiner—Duane A. Reger
Attorney, Agent, or Firm—Raymond J. Slattery, III

[57] ABSTRACT

An indicator for monitoring both the temperature and the degree of wear of a brake. Specifically this invention may be used with multi-disk brakes, especially aircraft brakes. Upon brake actuation, a pressure plate compresses stationary and rotating members to provide braking. A probe member moves with and in contact with the pressure plate. The degree of wear of the brake stack is determined by the relative distance traveled by the probe. The probe member may be marked with indicia for indicating the wear or remaining brake life. The probe member also has a thermocouple embedded within it, thereby providing temperature indication of the brake stack. Signals from the thermocouple may be transmitted for indication and/or processing. Furthermore, this invention provides for modification of existing wear pins by the attachment of a thermocouple assembly.

13 Claims, 4 Drawing Figures

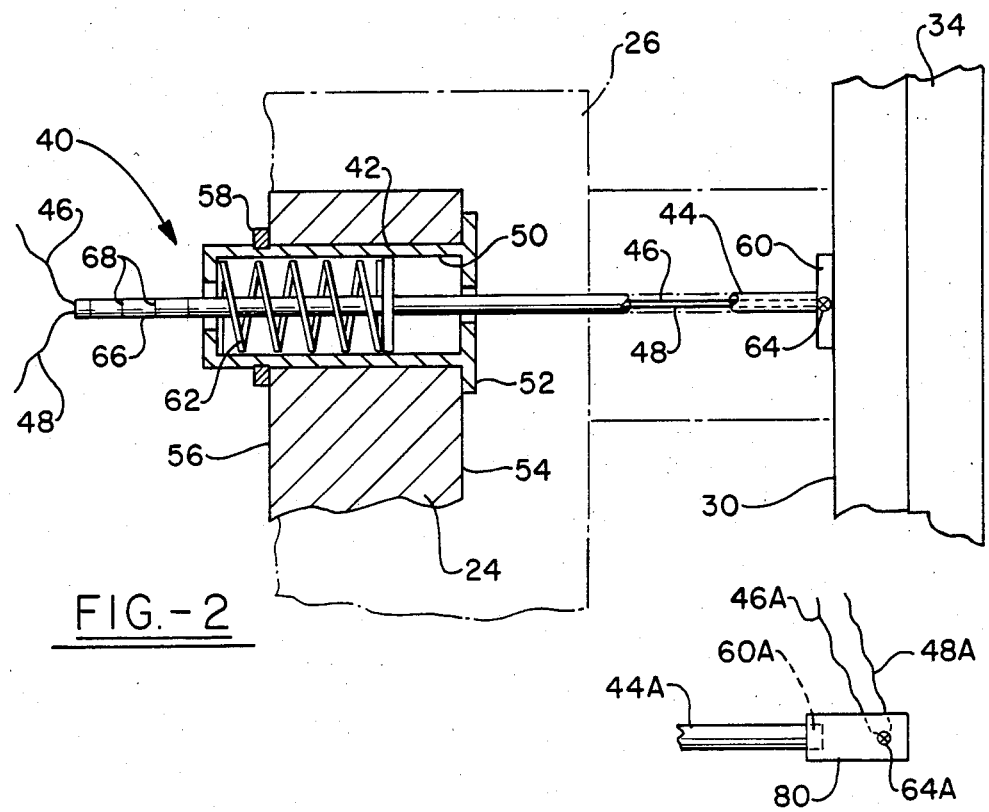
FIG.-2
FIG.-3
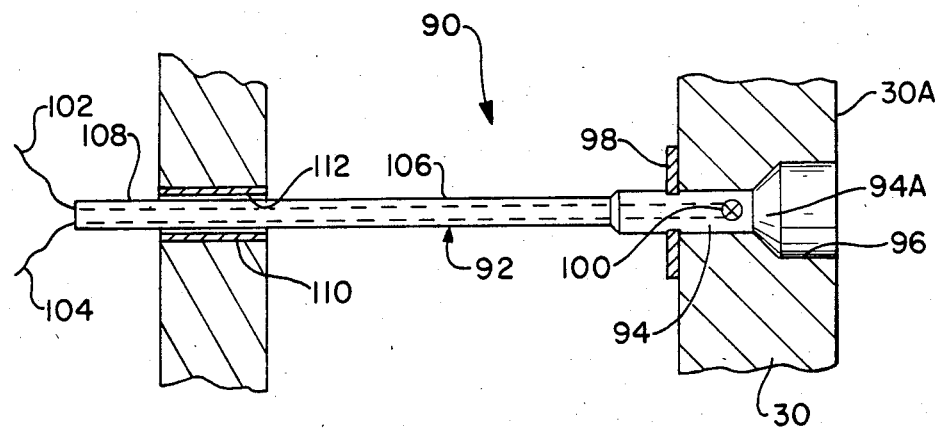
FIG.-4

BRAKE TEMPERATURE AND WEAR INDICATOR

BACKGROUND OF THE INVENTION

This invention provides an advancement in the art of monitoring the temperature and the degree of wear of a brake, and more specifically to the degree of wear of an aircraft multi-disk brake assembly.

Various reasons require that the temperature of a brake stack should be monitored. One reason is to indicate excessive temperatures within the brake and thereby initiating an alarm condition. Another reason is to provide input data for a system of controlling the amount of energy absorbed by a brake stack. In such a system, the initial temperature rate of rise of the pressure plate is related to the amount of torque developed by the brake stack. To provide this needed input data, the sensor must provide accurate temperature data in a minimum amount of time.

It is also of primary importance to maintain the brake stack in good working order, replacing members as required before they are completely worn. Therefore, indication of the wear of the brake stack is also highly important.

Various temperature sensors monitor the brake stack temperature indirectly. Many have been mounted within the brake assembly with the majority attached to the torque tube. These sensors typically have lower temperature readings and slower response times. Furthermore, various wear indicators have been used to indicate the degree of brake wear. This requires two separate devices each requiring their own installation involving drilling, cutting, attaching, etc. None, however, discloses such a novel arrangement of combining both functions in the manner as described herein.

BRIEF SUMMARY OF THE INVENTION

This invention provides for an indicator for monitoring both the temperature and the wear of a brake. The indicator includes a probe member, having a thermocouple secured within, in thermal conductive contact with the brake stack, specifically the pressure plate. The probe member monitors the degree of wear of the brake by it's relative distance traveled when the brake is actuated while the thermocouple monitors directly the temperature of the brake stack.

It is the object of this invention to:

1. Provide a temperature indicator which is in contact with the brake stack for registering higher and more accurate temperatures with a faster response time than those which are not.
2. Provide a temperature sensor which maintains its thermal engagement with the brake stack as it wears.
3. Provide an indicator which combines the function of both temperature and wear indication into one indicator, thereby eliminating one component and reducing installation time and cost.
4. Provide the necessary apparatus to modify existing wear pins, by the addition of a temperature sensor, to become both a wear and temperature indicator.
5. Provide isolation of the thermocouple from the brake frame.
6. Provide an indicator which is readily accessible.

BRIEF DESCRIPTION OF THE DRAWINGS

The following is a brief description of the drawings in which like parts bear like reference numeral and in which:

FIG. 2 is a sectional elevation of the indicator in accordance with this invention.

FIG. 3 is an elevation of a modification of the indicator of FIG. 2 which is especially adapted for retrofitting existing wear pins.

FIG. 4 is a sectional elevation of an alternate embodiment of an indicator in accordance with this invention.

DESCRIPTION OF THE INVENTION

Figure 1:
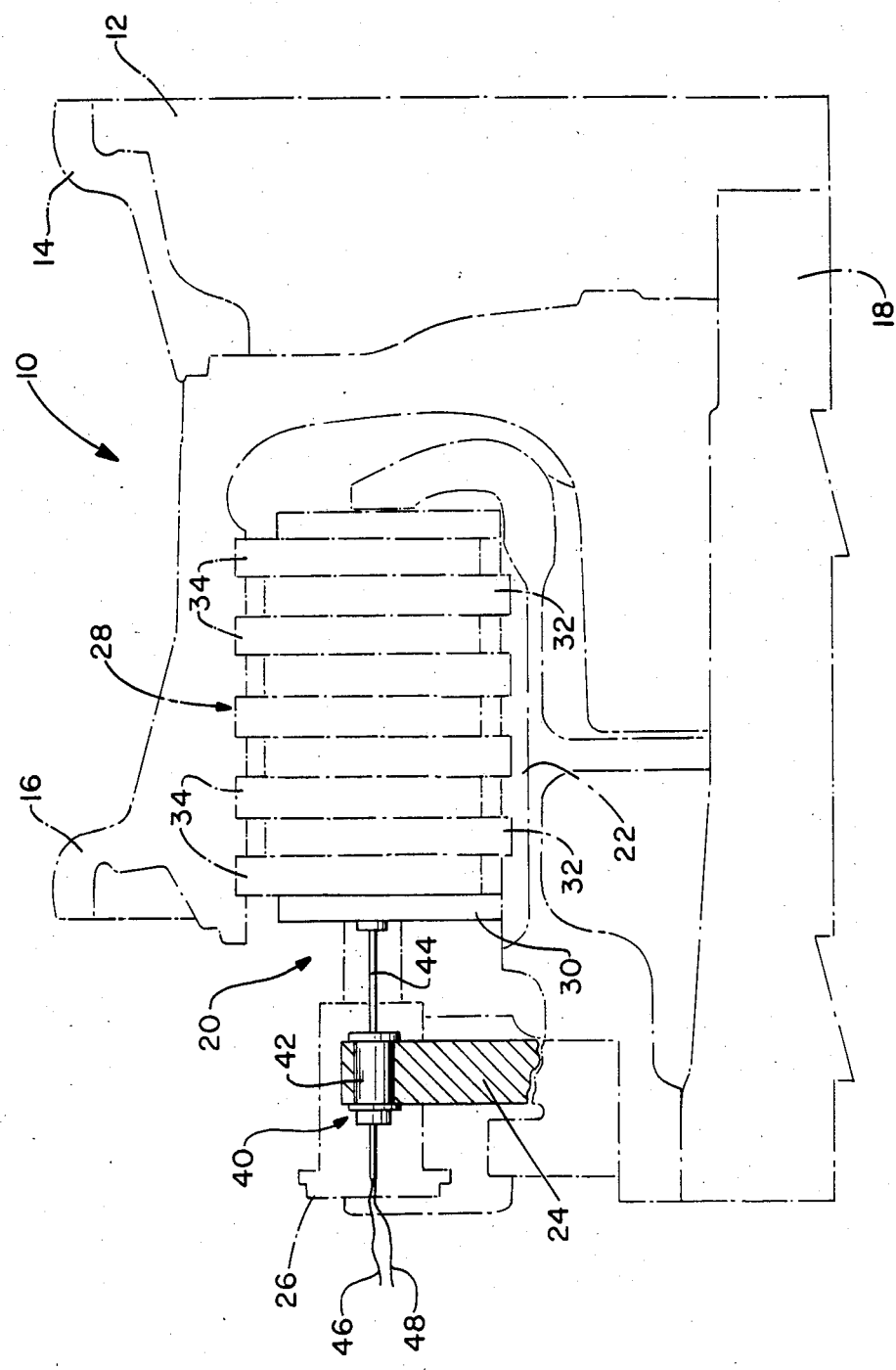
FIG. 1 is a sectional elevation of a portion of a conventional aircraft wheel and brake assembly with the invention incorporated therein. Portions that are relevant to this invention are shown in solid lines while the non-relevant are shown in phantom.

FIG. 1 of the drawings illustrates a typical aircraft wheel and brake assembly generally indicated by reference number 10. For purposes of clarification, portions which are relevant to this invention are shown in solid lines while the less important areas are shown in phantom. The wheel 12 of the wheel and brake assembly 10 may, though not necessarily, be of a two part construction consisting of an outboard wheel half 14 and an inboard wheel half 16. The wheel is mounted for rotation about an axle 18. A multi-disk brake assembly, generally indicated by reference number 20, may be mounted within the cavity formed by the inboard wheel half 16. The brake assembly 20 comprises a torque tube 22, brake housing 24, actuating means 26, and a brake stack 28 including a pressure plate 30, stationary members 32 keyed to the torque tube 22 and rotating members 34 keyed to the inboard wheel half 16. Upon actuation of the brake assembly 20, the actuating means 26 applies pressure to the pressure plate 30, compressing stationary 32 and rotating 34 members together, dissipating energy, and thereby stopping the rotation of the wheel.

This invention provides for an indicator for monitoring both the temperature and the wear of a brake. The indicator is comprised of a movable probe member in thermal contact with the brake stack 28, specifically the pressure plate 30. The probe member has a thermocouple secured within it which is also in thermal contact with the probe member, wherein the temperature developed in the brake stack 28 is thermally transmitted to the thermocouple. The electrical signals generated by the thermocouple may be transmitted for indication and/or processing. The probe member also indicates the degree of wear of the brake stack 28 by the relative distance traveled by the probe member when the brake is actuated. A typical indicator, generally shown as numeral 40, embodies this concept and includes a housing 42, a movable probe member 44 and electrical conductors 46 and 48.

Now referring to FIG. 2, the indicator 40 of FIG. 1 is further illustrated by a sectional elevation. The housing 42 is axially elongated forming a bore 50 and may be mounted such that it is substantially axially parallel with the brake stack 28 and axle 18 and also substantially perpendicular to the pressure plate 30. The outboard end 52 of the housing 42 may be flanged in order to more firmly secure the indicator 40 to the brake housing's outboard surface 54. The housing 42 may be secured to the brake housing's inboard surface 56 by the use of a snap ring 58 or other retaining device. The movable indicator 44 may be cylindrical in shape and it is anticipated, although not necessarily, that the outboard end 60 is flared to provide for good surface contact. The indicator 40 further includes a biasing means 62, such as a spring, located within the housing bore 50 for biasing the outboard end 60 of the movable probe member 44 into thermal contact with the pressure plate 30. The outboard end 60 has secured there within a thermocouple 64.

Now, as the pressure plate 30 moves to compress the stationary 32 and rotating 34 members during braking, the movable probe member 44 will also move to maintain contact with the pressure plate by the force exerted on it by the biasing means 62. As energy is dissipated within the brake, heat is generated within the brake stack 28. This heat is transmitted to the probe's outboard end 60, which in turn is transmitted to the thermocouple 64. The electrical signals generated by the thermocouple may be transmitted by the conductors 46 and 48 to a remote sensing location for processing and/or indication.

The wear of the brake stack 28 may be monitored in the conventional manner. With the aircraft stopped, the brakes are actuated causing the brake stack to compress as described above and causing probe member 44 to slide to maintain contact with the pressure plate 30. The relative degree of wear of the brake stack 28 is then determined by the length of the probe's inboard end 66 remaining outside of the housing 42. The position of the pressure plate 30 will vary as the rotating and stationary members 34, 32 wear. Likewise, the distance traveled by the movable probe member 44 will vary producing a corresponding indication of the remaining brake life. The inboard end may also be marked with indicia 68 for easier determination of the remaining wear.

The probe member 44 should be a material capable of withstanding high temperatures which can be in excess of 2000° F. for carbon brakes and capable of thermal conduction for at least the portion between the thermocouple and the portion in contact with the pressure plate. Such suitable materials would include chrome and silicon steels. The probe could also be made of a relatively non-conductive material, such as powder metal stainless steel, in the housing region to reduce the possibility of thermally sinking into the brake housing 24 and thereby lowering the probe indicated temperature.

Now referring to FIG. 3, an alternate embodiment of the invention includes an indicator substantially similar to item 40, but wherein the thermocouple 64A and electrical conductors 46A and 48A are mounted instead in another probe member 80 which is attached to the movable probe member 44A at the outboard end 60A. This can be accomplished by: crimping, screwing, or any number of other common methods. The advantages of this embodiment are twofold.

First, probe 44A can be non-conductive, providing effective thermal insulation from the brake housing 24 as described above. Second, this provides an easy method of modifying existing wear indicators to also provide temperature indication. This will be important in retrofitting existing assemblies not equipped with temperature sensors or those in which the sensor monitors temperature through a secondary medium, such as the torque tube 34. However, when probe member 80 is added to an existing wear indicator, the length of the movable probe member 44A will be increased. To offset this, the movable probe member may be cut or marked appropriately.

Now referring to FIG. 4, another alternate embodiment of the indicator, generally referred to as 90, includes a movable probe member 92 having an outboard end 94 which may be releasably attached to the pressure plate 30.

The pressure plate has a countersink bore 96 extending therethrough. The outboard end 94 has a flanged portion 94A for coupling with the countersink 96. The outboard end may be releasably attached by a retaining device 98, such as a snap ring. A thermocouple 100 is located within and in thermal conductive engagement with the outboard end 94. Electrical conductors 102 and 104 transmit signals for processing and/or indication and may extend through the body 106 and exit from the inboard end 108 of the probe 92.

The inboard end 108 extends through sleeve 110 mounted in a bore 112 in the brake housing 24 such that the probe member 92 is capable of slidable movement therein. The degree of wear may then be determined from the inboard end 108 as described above for item 40.

This embodiment provides for good thermal conductive engagement with the pressure plate 30. The closer the probe member can be located to the wear surface 30A, the greater the accuracy will be while decreasing the delay time of the thermocouple response. However, the probe cannot be located too close as it may come in contact with a rotating member as the wear surface is worn away. Therefore, it is anticipated that the probe should be located approximately at the midpoint of the pressure plate.

These descriptions and details have been shown for the purpose of illustrating this invention and that it will become apparent to those skilled in the art that various changes and/or modifications may be made therein without departing from the original spirit or scope of the invention.

I claim:

1. In a brake assembly having a brake housing, at least one stationary member to provide braking of a rotating member when subjected to a pressure force by a pressure plate; an indicator comprising:
   a movable probe member in contact with and releasably attached to said pressure plate wherein the degree of wear of said stationary and rotating members is indicated by the relative distance traveled by said probe member when said brake assembly is actuated; and
   a thermocouple disposed within said probe member, secured in thermal conductive engagement therein, for monitoring the temperature of said pressure plate.

2. The indicator as set forth in claim 1 wherein said movable probe member further comprises:
   an axially elongated body having a first and second end, said first end releasably attached to said pressure plate, said second end extending through a bore in said brake housing and adapted for slidable movement therein.

3. The indicator as set forth in claim 2 further comprised by:
   said pressure plate, having a countersink bore extending therethrough,
   said first end of said probe member having a flanged portion coupling with said countersink bore and releasably attached thereto by a retaining device;

and said second end is marked with a plurality of calibrated indicia to indicate the degree of brake wear.

4. In a brake assembly having a brake housing, at least one stationary member to provide braking of a rotating member when subjected to a pressure force by a pressure plate; an indicator comprising:
a housing, defining a bore;
a biasing means, disposed within said housing bore; and
a movable probe member having an axially elongated body disposed within said housing bore and operatively engaging said biasing means, for reciprocal movement therein and having first and second ends extending outside of said housing bore, the first end positioned in contiguity with said pressure plate by said biasing means and having a thermocouple secured in thermal conductive engagement therein for monitoring the temperature of said pressure plate; and
wherein the degree of wear of said stationary and rotating members is indicated by the relative distance traveled by said probe member when said brake assembly is actuated.

5. The indicator as set forth in claim 4 wherein said housing is mounted within said brake housing.

6. The indicator as set forth in claim 5 wherein said biasing means is a spring.

7. The indicator as set forth in claim 6 wherein said second end of said probe member is marked with a plurality of calibrated indicia to indicate the degree of brake wear.

8. In a brake assembly having a brake housing, at least one stationary member to provide braking of a rotating member when subjected to a pressure force by a pressure plate; an indicator comprising:
a housing, defining a bore;
a biasing means, disposed within said housing bore;
a movable probe member having an axially elongated body disposed within said housing bore and operatively engaging said biasing means, for reciprocal movement therein and having first and second ends extending outside of said housing bore;
another probe member attached to the first end of said movable probe member, and in contiguity with said pressure plate by a force exerted on said movable probe member by said biasing means;
a thermocouple disposed within said other probe member and in thermal conductive engagement therein for monitoring the temperature of said pressure plate; and
wherein the degree of wear of said stationary and rotating members is indicated by the relative distance traveled by said probe member when said brake assembly is actuated.

9. The indicator as set forth in claim 8 wherein said housing is mounted within said brake housing.

10. The indicator as set forth in claim 9 wherein said biasing means is a spring.

11. The indicator as set forth in claim 10 wherein said movable probe member is thermally non-conductive and said other probe member is thermally conductive.

12. The indicator as set forth in claim 11 wherein said second end of said movable probe member is marked with a plurality of calibrated indicia to indicate the degree of brake wear.

13. In an aircraft multi-disk brake assembly having an inboard end and an outboard end, including a brake housing at the inboard end and a brake stack at the outboard end comprising a pressure plate, and stationary members to provide braking to rotatable members when subjected to a pressure force by an actuating means on said pressure plate and the position of said pressure plate varying with the degree of wear of said brake stack; and indicator for sensing and indicating both the temperature and the degree of wear of said brake stack comprising:
a housing, disposed within said brake housing, defining a bore having an axis positioned substantially perpendicular to said pressure plate;
a biasing means, disposed within said housing bore;
an axially movable probe member disposed within said housing bore, operatively engaging said biasing means for reciprocal movement therein and having inboard and outboard ends extending outside of said housing bore;
said outboard end positioned in contact with said pressure plate by said biasing means;
a thermocouple, disposed within said outboard end and secured in thermal conductive engagement therein;
said inboard end being marked with a plurality of indicia for indicating the degree of brake wear; and
wherein upon activation of said brake stack said probe member moves axially, maintaining contact with said pressure plate at the outboard end for monitoring the temperature of said brake stack and for determining the degree of wear of said brake stack by the distance traveled by said inboard end.

* * * * *